United States Patent [19]
Rotier

[11] Patent Number: 4,829,250
[45] Date of Patent: May 9, 1989

[54] MAGNETIC DIRECTION FINDING DEVICE WITH IMPROVED ACCURACY

[75] Inventor: Donald J. Rotier, St. Paul, Minn.

[73] Assignee: Honeywell, Inc., Minneapolis, Minn.

[21] Appl. No.: 154,230

[22] Filed: Feb. 10, 1988

[51] Int. Cl.$^4$ ............................ G01B 7/14; G01S 3/02
[52] U.S. Cl. .................................. 324/225; 324/208; 324/247; 364/559; 340/870.32
[58] Field of Search ............... 324/208, 225, 245, 247, 324/260, 261; 340/870.32; 364/559, 731; 382/43, 44; 342/451, 463, 448

[56] References Cited

U.S. PATENT DOCUMENTS

| | | | |
|---|---|---|---|
| 3,937,078 | 2/1976 | Williams | 340/870.32 |
| 4,054,881 | 10/1977 | Raab | 342/448 |
| 4,287,809 | 9/1981 | Egli . | |
| 4,396,885 | 8/1983 | Constant | 324/208 |
| 4,584,577 | 4/1986 | Temple | 340/870.32 |
| 4,642,786 | 2/1987 | Hansen | 364/559 |
| 4,646,013 | 2/1987 | Tornblom | 324/225 |
| 4,688,037 | 8/1987 | Krieg | 342/448 |

Primary Examiner—Reinhard J. Eisenzopf
Assistant Examiner—Jose M. Solis
Attorney, Agent, or Firm—Orrin M. Haugen; Thomas J. Nikolai; Frederick W. Niebuhr

[57] ABSTRACT

A system for determining the relative orientation in three dimensions between a fixed frame of reference and an unconstrained object. Mutual coupling between three orthogonally disposed transmitting coils driven by a multifrequency source and three orthogonal receiving coils produce sets of analog voltages which are sampled; digitized and processed using a fast fourier transform device to yield directional components for determining the pitch and yaw angles about a line-of-sight axis. By using a multi-frequency source to drive the transmitting coils and by deriving coordinate component measurements to at least two discrete frequencies, errors in the results due to eddy currents in surrounding conductive structures can be compensated for.

5 Claims, 3 Drawing Sheets

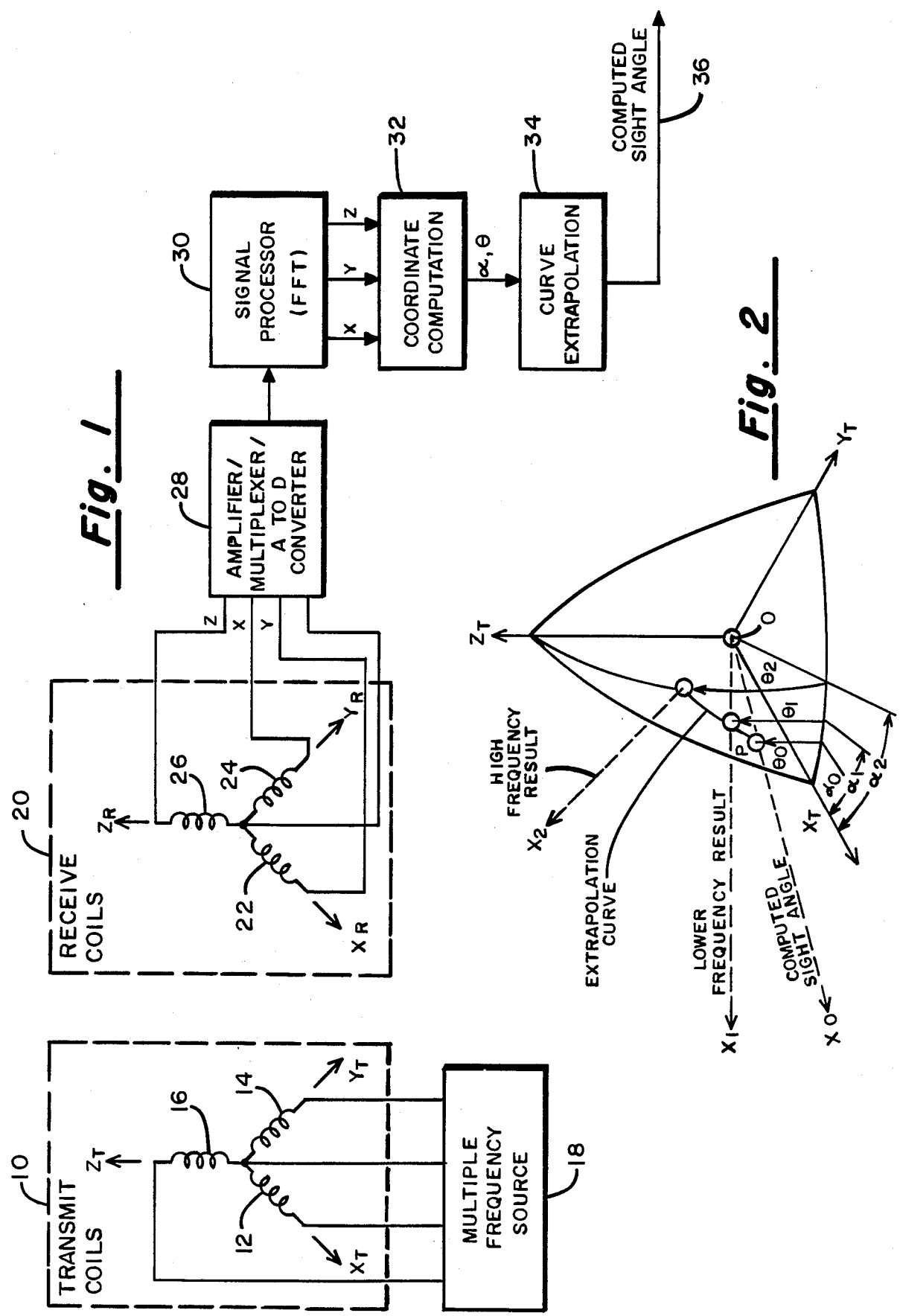

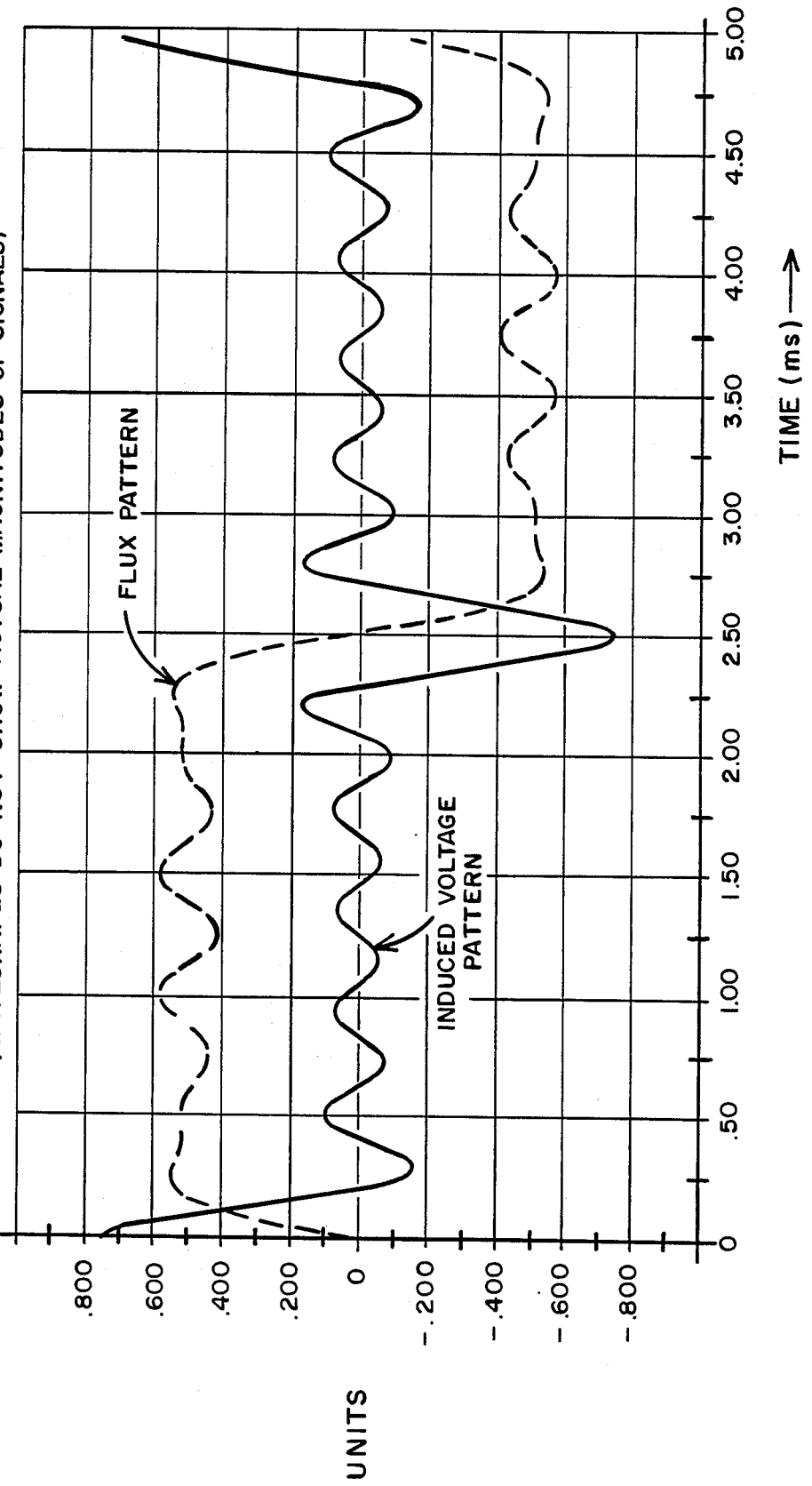

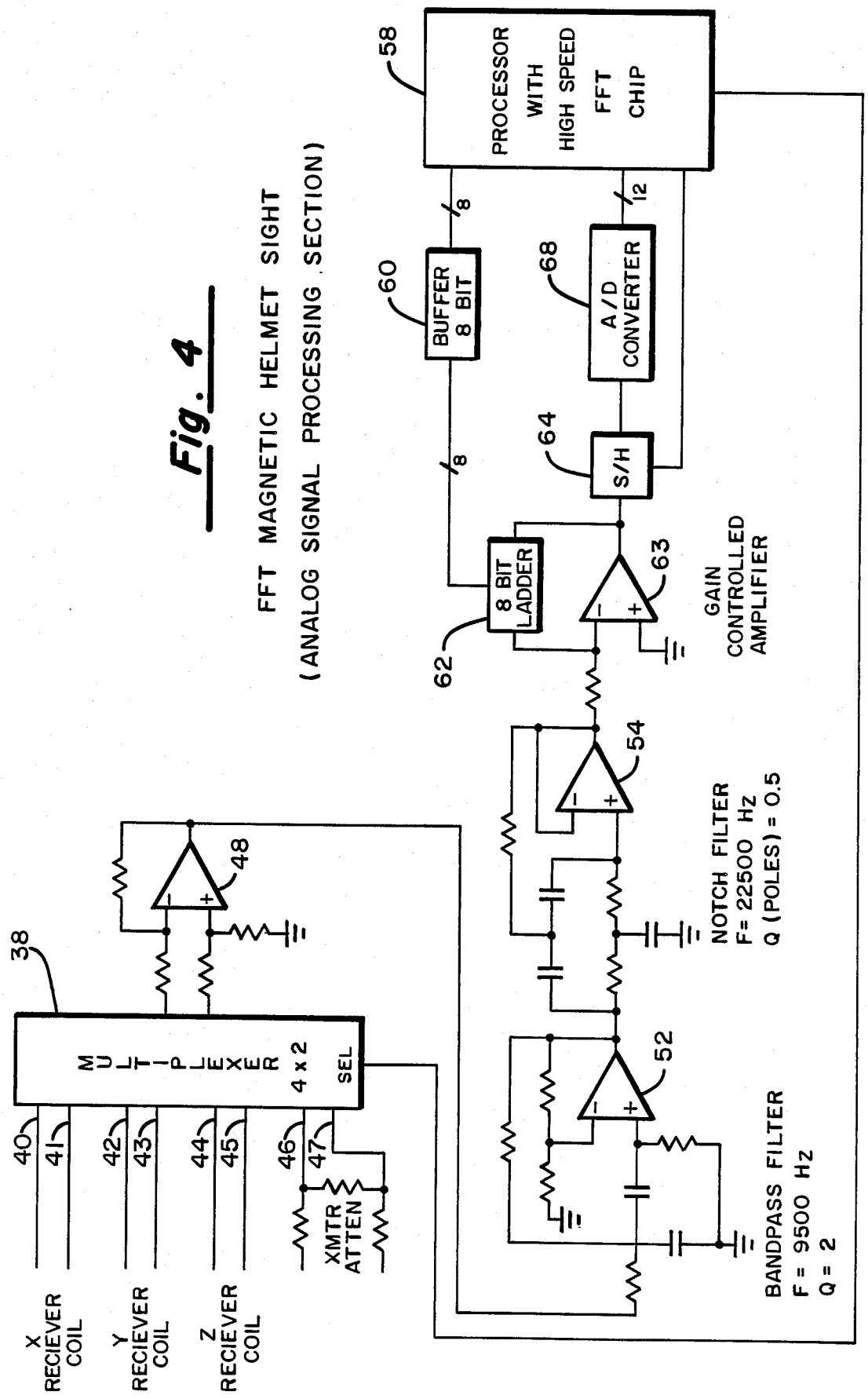

MAGNETIC DIRECTION FINDING DEVICE WITH IMPROVED ACCURACY

BACKGROUND OF THE INVENTION

I. Field of the Invention

This invention relates generally to apparatus for accurately measuring the orientation of an unconstrained body with respect to a fixed reference system, and more particularly to a system used principally in military aircraft wherein the aiming point is designated by sighting through a viewing system incorporated into the pilot's helmet.

II. Description of the Prior Art

A principal use for the present invention is in target designation. When the pilot identifies a target to be attacked, he causes a reticle in his helmet visor system to coincide with the target and indicates that coincidence by means of a push-button switch control. At that instant, the orientation measurement system must be able to precisely identify the orientation of the helmet with respect to a fixed reference, typically the air frame.

It is very desirable that the orientation measurement system operates in a manner which in no way constrains the movement of the pilot's head. Two non-contact methods for performing this measurement are well known in the prior art, namely, optical and magnetic. Optical systems, such as that disclosed in the LaRussa U.S. Pat. No. 4,439,755 employ a collimated optical source fixed to the pilot's helmet and precisely oriented with respect to the line-of-sight axis. An optical receiver, which is sensitive to the angle of arrival of the optical beam transmitted from the helmet, is used to determine the orientation of the helmet. A commonly used method for determining the angle of arrival of the beam is to employ a dual-axis photo-detector in which X and Y axis analog voltages provide an electrical output which is proportional to the angle of arrival of the beam of light impinging on t he photo-detector.

Such optical systems, however, suffer a number of significant limitations. First of all, an unobstructed line of sight must be maintained between the optical transmitter and receiver for all possible orientations of the helmet. This requirement often may be difficult to achieve in modern cockpit configurations. While oftentimes all optical systems can maintain a high degree of accuracy over limited field-of-view, the accuracy is diminished over a practical field-of-view of ±70° of azimuth or pitch and ±120° of azimuth or yaw which is typically required.

U.S. Pat. No. 4,396,885 to Constant describes a magnetic system which is capable of an increased dynamic range of operation, which thereby translates into higher accuracy over a large field-of-view. In a typical magnetic system, such as that exemplified by the Constant patent, the helmet transmitter is comprised of three mutually orthogonal magnetic coils, one each for the X, Y and Z axis with respect to the line-of-sight reference of the helmet reticle. Likewise, the receiver is comprised of three mutually orthogonal coils, one each for the X, Y and Z axis with respect to the fixed reference of the air frame. An operational system, as will be subsequently described in more detail, relies on an accurate measurement, axis-by-axis, of the mutual magnetic inductive coupling between a transmitter coil and its respective corresponding receiver coil. As in the system of the above-referenced Constant patent, the measurement is generally accomplished using a single AC frequency for exciting the three transmitter coils in sequence and tuning the receiver to reject everything but that single frequency and, thus, generally rejecting all stray magnetic signals which might otherwise introduce error. The AC excitation frequency determines the tracking rate of the measurement system. An excitation frequency of the order of 10 KHz is required for a system to accurately track the rapid head motions that would normally be encountered. Unfortunately, at this range of frequency, the position accuracy of the system may be severely degraded due to eddy current errors. That is to say, at higher frequencies, the AC magnetic field generated by any of the transmitter coils may induce eddy currents in all of the surrounding conductive material, such as the aircraft fuselage. These eddy currents, in turn, generate an associated magnetic field. The net result is that the surrounding conductive material distorts the transmitted magnetic field, so as to introduce an error in the position measurement. There is, thus, no practical prior art system which combines the very desirable features of a wide field-of-view, accurate position determination, and rapid tracking of the helmet motion.

It is the principal object of this invention to perform the direction measurement in such a way that all of the above-mentioned desirable features are simultaneously and effectively realized.

SUMMARY OF THE INVENTION

As was previously described, eddy current errors can significantly degrade the accuracy of a magnetic measurement system at practical excitation frequencies. To maintain a high tracking rate and to adequately reject stray magnetic signals, which themselves could be alternate sources of error, it is imperative to maintain an excitation frequency on the order of 10 KHz. Thus, a means must be provided to accurately perform a measurement at this higher frequency and then apply a correction factor to the measurement, which totally accounts for magnetic fields occasioned by eddy currents, to provide a result equivalent to the theoretical limit afforded by DC excitation. This would be a relatively simple matter if the eddy current error were only a function of the angular orientation of the helmet, i.e., roll, pitch and yaw, since, in this case, the eddy current correction could be computed directly from a measured set of x, y and z components. However, the induced error is a function of both rotational orientation and X, Y and Z coordinate position relative to the receiver. Thus, a single set of measured x, y and z components is insufficient to make the error correction.

The present invention overcomes this problem by performing coordinate component measurements, concurrently, at least two discrete, preselected frequencies. Since the magnitude of the eddy current error is a function of frequency, these measurements provide sufficient information to compute the error allowing it to be removed from the computed orientation of the fixed and movable objects. While the preferred embodiment of this invention discloses the use of two sets of excitation frequencies, it is understood that even greater accuracy might be realized by employing additional sets of such frequencies.

The foregoing principal objects as well as other features and advantages of the present invention will become apparent to those skilled in the art from the following detailed description of a preferred embodiment, especially when considered in conjunction with the accompanying drawings in which like numerals in the several views refer to corresponding parts.

DESCRIPTION OF THE DRAWINGS

FIG. 1 is a block diagram representation of the preferred embodiment;

FIG. 2 is a three-dimensional vector diagram useful in an understanding of the present invention;

FIG. 3 represents graphically a multi-frequency transmitter drive signal; and

FIG. 4 is a detail block diagram of the circuitry for implementing the amplifier/multiplexer/A-to-D converter module of the block diagram of FIG. 1.

DESCRIPTION OF THE PREFERRED EMBODIMENT

FIG. 1 is a block diagram of the coordinate measurement system comprising the present invention. The transmit coil assembly 10 is comprised of three mutually orthogonal coils 12, 14 and 16, and, as indicated by the legends, each is aligned with the $X_T$, $Y_T$ and $Z_T$ axes of an Eulerian coordinate system, respectively. The transmit coil assembly is assumed to be permanently fixed to the measurement reference platform. For example, in an aircraft helmet sight application, the $X_T$, $Y_T$ and $Z_T$ axes would correspond to the roll, yaw and pitch axes of the aircraft, respectively. Excitation is sequentially provided to the three transmitter coils. This excitation consists of two or more frequency components. The lowest of these frequency components, termed the fundamental component, would be as lo as possible consistent with the desired update rate for the overall system. A typical fundamental frequency might be 200 Hz. Any additional frequency components would be harmonics of the fundamental and would be selected to span a significant frequency range. In a typical application, the second frequency would be 2,000 Hz or the tenth harmonic of the fundamental. Since the error reduction will be accomplished by extrapolating the trend from higher to lower frequencies, the use of additional intermediate harmonics will enhance the error reduction process. As is well understood in the signal processing art, the frequencies employed should be judiciously chosen using the Nyquist criteria to avoid interference or aliasing in subsequent signal processing operations.

The receive coil assembly 20 is comprised of mutually orthogonal coils 22, 24, 26, also aligned with the $X_R$, $Y_R$ and $Z_R$ axes of the reference coordinate system. The receive coil coordinate system corresponds to the movable assembly of the measurement system. For example, in a helmet sight system, the $X_R$ axis would correspond to the pilot's line-of-sight through the helmet sight reticle.

The amplifier/multiplexer/A-to-D converter 28 converts the analog signals from the three receive coils into digital samples which are presented to the signal processor 30. Specifically, at each sample interval, the instantaneous value of the voltage signals coupled into the receive coils, x or y or z is converted to a digital value and provided as input values to the signal processor 30. The sample rate is preferably chosen such that in a typical case in a 5 millisecond time period, 64samples of all three channels are provided. With this 5millisecond sample interval, the motion of the movable body (the helmet) during this time is negligible and the data can be considered as concurrent, representing a measurement at a single instant in time.

For each sample interval, the signal processor 30 performs a fast Fourier transform (FFT) to compute a set of x, y and z components for each set of excitation frequencies. For example, if a fundamental and one harmonic frequency are used with multiple frequency source 18 (one relatively high frequency and one relatively low frequency per axis), signal processor 30 will produce two independent sets of x, y and z components, one for the relatively high harmonic frequency and another for the relatively fundamental frequency. The three components, x, y and z, which are outputs of the signal processor 30, are sufficient to identify the physical orientation of the receive coils 20 with respect to the transmit coils 10. Of specific interest are the angles $\alpha$ and $\theta$, which represent the rotation of the receive coils in yaw and pitch, respectively, from the reference orientation of the transmit coils 10. Coordinate computation 32 computes a pair of angles $\alpha$ and $\theta$ for each set of x, y, z components generated by signal processor 30. As described before, each set of angles thus produced will exhibit a degree of eddy current error in each of them, where this error is a function of the excitation frequency. Curve extrapolation 34 uses the multiple samples provided by coordinate computation 32 to effectively estimate the eddy current error component and then remove it to generate the relatively error-free computed sight angle output on line 36. Well-known curve fitting techniques may be employed to provide the best estimate of this resulting angle. The functions represented by blocks 30, 32 and 34 in FIG. 1 all involve well-understood digital processing algorithms and may be accomplished with various configurations of general purpose or special purpose digital processors.

FIG. 2 shows a graphical presentation of the system operation. Vectors $X_T$, $Y_T$ and $Z_T$ represent the orthogonal axes of the reference platform for transmit coils 10. For clarity, only one octant of a sphere is shown. However, the principles can be extended to all other space. One set of x, y and z components based on high frequency excitation results in a predicted axis, X2, which is established by angles $\alpha_2$ and $\theta_2$. A second set of x, y and z components based on lower frequency excitation results in a different axis, X1 which is established by angles $\alpha_1$ and $\theta_1$. The intersection of lines X2 and X1 with a spherical surface establishes a trajectory which can be extrapolated to point P. The line from the origin, O, to the point, P, is thus the computed sight angle.

Referring next to FIG. 3, it shows a particularly efficient way for generating a multiple frequency excitation for the transmit coils 10. The induced voltage pattern is generated by summing 200, 600, 1,000, 1,400, 1,800 and 2,200 Hz frequency components. This voltage pattern when applied to the transmit coils 10 results is a pseudo square wave flux pattern which is shown in dashed lines.

FIG. 4 shows a detailed block diagram implementation of the amplifier/multiplexer/A-to-D converter circuitry shown as block 28 in FIG. 1. Multiplexer 38 may comprise a 4×2 differential multiplexer. It receives differential input signals from receive coils 22, 24, 26 on inputs 40–45, respectively. Differential inputs 46 and 47 provide an attenuated transmitted signal which is useful for calibration purposes. The operational amplifier 48 provides a linear amplification of the signal selected by multiplexer 38. Bandpass filter 52 rejects out-of-band noise while one or more notch filters 54 may be added to provide additional rejection at predetermined frequencies which may be emanating from a stray signal source within the area occupied by the system of the present invention. For example, the frequency of the horizontal sweep of the magnetic deflection circuitry typically used in cockpit displays can be an overwhelming source of noise for the system if not specifically rejected by a notch filter or the like.

Processor 58 controls the selection of the input signal via multiplexer 38 and its conversion to a digital input. Analog signals may be prescaled before being converted to make maximum use of the dynamic range of the A/D converter. In this regard, an 8-bit scaling value is transmitted to a buffer register 60 which controls the state of an 8-bit ladder network 62. Ladder 62 is placed in the feedback loop of an AGC amplifier 63 so that the resulting gain of this stage is proportional to the value stored in buffer 60.

In generating one digital sample, the following steps are executed: (1) Processor 58 selects the input channel 40–45 to be sampled; (2) It transmits the scaling value to buffer register 60; (3) It captures the analog output of amplifier 63 in sample-and-hold circuit 64 and presents this value as the analog input to A/D converter 68; (4) The A/D converter, in turn, transforms this value to a 12-bit digital number which is provided as an operand input to processor 58.

The signal processor 30 in FIG. 1 preferably includes a high-speed fast fourier transform chip, such as the Type 32010 device sold by the Texas Instruments Company, which is found to allow a sufficiently high system update rate and an adequate number of samples to match with the A-to-D converter employed which accommodates a 25 millisecond cycle time. As earlier mentioned, using an FFT computation algorithm, the processing computer 30 extracts from each axis the value of the multiple frequency components used to drive the transmitter coils 10. Once the information from the three transmitter axes have been received and processed, a matrix of nine components are available for each frequency component employed. This allows computation of the location and angular orientation of the helmet coils with respect to the transmitter coils to be accomplished.

This invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to equipment details and operating procedures, can he accomplished without departing from the scope of the invention itself.

What is claimed is:

1. Apparatus for accurately measuring the relative positioning in three-dimensional space of a first object relative to a second object when said objects are in proximity to surrounding structures tending to distort magnetic field patterns, comprising:
    (a) a first plurality of mutually orthogonal flux transmitting coils affixed to said first object to define a coordinate frame of reference;
    (b) a second plurality of mutually orthogonal flux receiving means affixed to said second object;
    (c) means for energizing each of said transmitting coils with a voltage having a number of harmonically related frequency components sufficient to characterize the distortion of said magnetic field patterns;
    (d) means coupled to said plurality of receiving means for periodically sampling the instantaneous analog voltage induced in said receiving means by the transmitted flux and converting said analog voltage samples into a corresponding digital value;
    (e) FFT processor means coupled to receive said digital values for determining pitch and yaw angles of said first object concurrently at said number of harmonically related frequencies; and
    (f) computing means coupled to receive digital values defining the multiple pitch and yaw angles to the multiple harmonically related frequencies for mathematically extrapolating said multiple pitch and yaw angles to produce an estimate of a pitch and yaw angle associated with an arbitrarily low frequency at which distortion of said magnetic field is substantially zero.

2. The apparatus as in claim 1 wherein said first object is an aircraft and said second object is a pilot's helmet.

3. The apparatus as in claim 1 wherein said means coupled to said plurality of receiving means comprises multiplexer means for sequentially sampling said analog voltage induced in each of said flux receiving means and analog-to-digital converter means coupled to receive the analog signals and producing said corresponding digital values.

4. The apparatus as in claim 3 and further including analog signal processing means coupling the output of said multiplexer means to said analog-to-digital converter means.

5. The apparatus as in claim 4 wherein said analog signal processing means includes band-pass filter means for passing only those signals falling within a band including said harmonically related frequency components emanating from said transmitting coils and notch-filter means coupled to receive the output from said band-pass filter and extraneous signals emanating from a stray signal source other than said transmitting coils for suppressing said extraneous signals.

* * * * *